United States Patent [19]

Inada

[11] Patent Number: 5,411,919

[45] Date of Patent: May 2, 1995

[54] SEMICONDUCTOR DEVICE AND METHOD OF MANUFACTURING THE SAME

[75] Inventor: Hiroshi Inada, Osaka, Japan

[73] Assignee: Sumitomo Electric Industries, Ltd., Osaka, Japan

[21] Appl. No.: 293,300

[22] Filed: Aug. 22, 1994

Related U.S. Application Data

[62] Division of Ser. No. 123,267, Sep. 20, 1993.

[30] Foreign Application Priority Data

Nov. 17, 1992 [JP] Japan .................................. 4-307156

[51] Int. Cl.6 ............................................ H01L 21/60
[52] U.S. Cl. ..................................... 437/209; 437/65; 437/133; 437/195; 437/217
[58] Field of Search .................... 437/209, 64, 65, 133, 437/195, 217, 220; 156/656, 657

[56] References Cited

U.S. PATENT DOCUMENTS

| | | | |
|---|---|---|---|
| 4,620,365 | 11/1986 | Burger et al. ........................ | 156/656 |
| 4,670,092 | 6/1987 | Motamedi .............................. | 437/65 |
| 5,188,983 | 2/1993 | Guckel et al. ........................ | 437/209 |
| 5,188,984 | 2/1993 | Nishiguchi ............................ | 437/209 |
| 5,225,373 | 7/1993 | Takahashi et al. .................... | 437/217 |
| 5,273,939 | 12/1993 | Becker et al. ......................... | 437/65 |

Primary Examiner—Brian E. Hearn
Assistant Examiner—Kevin M. Picardat
Attorney, Agent, or Firm—Lane, Aitken & McCann

[57] ABSTRACT

A semiconductor device such as a semiconductor acceleration sensor of an electrostatic capacity type and a method of manufacturing the same are disclosed, wherein a silicon layer is bonded to first and second glass layers by means of an anodic bonding process in such a manner as to be positioned between the first and second glass layers. The first glass layer has an overhung portion protruded from an edge of the second glass layer. At least an interconnection is formed between the silicon layer and the first glass layer and has a bonding pad positioned on the inner surface of the overhung portion of the first glass layer. Before the anodic bonding process, an anodic-bonding-inhibition-layer such as aluminum layer is positioned between a second glass wafer forming the second glass layer and a silicon wafer forming the silicon layer, and faces to a predetermined portion of a first glass wafer forming the first glass layer. The predetermined portion of the first glass wafer is to be the overhung portion of the first glass layer. During a dicing process after the anodic bonding process, the second glass wafer is cut along the configuration of the anodic-bonding-inhibition-layer, thereby removing an unnecessary portion of the second glass wafer facing to the overhung portion of the first glass layer from the remaining portions of the second glass wafer.

3 Claims, 5 Drawing Sheets

SEMICONDUCTOR DEVICE AND METHOD OF MANUFACTURING THE SAME

This is a division of application Ser. No. 08/123,267, filed Sep. 20, 1993.

FIELD OF THE INVENTION

The present invention relates to a semiconductor device, and more particularly to a semiconductor device such as a semiconductor acceleration sensor of an electrostatic capacity type which comprises two glass layers, a silicon layer bonded to the glass layers in contact with the inner surfaces of the glass layers, and at least an interconnection formed between the silicon layer and the glass layers. In addition, the present invention is concerned with a method of manufacturing the semiconductor device.

DESCRIPTION OF THE PRIOR ART

FIG. 7 is a sectional view showing a conventional semiconductor acceleration sensor of an electrostatic capacity type which is a semiconductor device called, for example, a micromachine and manufactured by utilizing semiconductor integrated circuit fabrication techniques. The conventional semiconductor acceleration sensor comprises a silicon layer 3, glass layers 4 and 5, and static electrodes 6 and 7. The silicon layer 3 is provided with a cantilever 2 having a weight 1 which serves as a movable electrode in a free end of the cantilever. The glass layers 4 and 5 are bonded to the silicon layer 3 in such a manner that the silicon layer 3 is sandwiched between the glass layers 4 and 5. The static electrodes 6 and 7 are formed on the inner surfaces of the glass layers 4 and 5, respectively, so as to face to the weight 1 of the cantilever 2. If acceleration is exerted on such an acceleration sensor, the weight 1 of the cantilever 2 is moved with respect to the glass layers 4 and 5 in response to the acceleration. The movement of the weight 1 results in a variation of the electrostatic capacity between the static electrodes 6 and 7, so that the acceleration can be detected on the basis of the variation of the electrostatic capacity.

Since the silicon layer 3 has a thickness of several hundreds of micrometers, it is difficult to derive the outputs of the static electrodes 6 and 7 through a gap between the glass layers 4 and 5 from interconnections formed between the silicon layer 3 and the glass layer 4 or 5 in view of the integrated circuit fabricating technology in the prior art. For this reason, the outputs of the static electrodes 6 and 7 are derived by way of through bores 8 formed in the glass layers 4 and 5.

If, however, a plurality of acceleration sensors are derived from a silicon wafer and two glass wafers of the same order of magnitude as the size of the silicon wafer through a semiconductor manufacturing process, the conventional acceleration sensor encounters such difficulties that the through bores 8 formed in the glass wafers cause the strength of the glass wafers to be reduced.

In addition, the through bores 8 are formed by an electrolytic discharge machining process (referred to M. Esahi: Appl. Phys., Vol. 60, No. 3, 1991, pp. 227-238). When, specifically, discharges are caused between the glass layer 4 or 5 and a pointed head of an electrode into a sodium hydroxide solution, heat is generated, thereby rapidly etching the glass layer 4 or 5 to form the through bores 8. If, however, a number of electrodes are provided in the acceleration sensor, it is necessary to carry out the discharge treatments the same times as the number of the electrodes. Therefore, the process of forming the through bores 8 takes a long time.

After the through bore forming process, the bottom and side surfaces of the through bores 8 are covered with Cr—Cu—Au alloys 9 and filled up with conductive epoxy resins. The alloys 9 make it impossible to carry out wire bonding process, so that the aforementioned acceleration sensor is not suitable for mass production.

The present invention has been made to overcome the foregoing problems in the prior art, and an object of the present invention is to make unnecessary the process of forming the through bores in the glass layers and make it possible to directly bond the wires to bonding pads which are formed on the inner surface of the glass layer and electrically connected to the electrodes.

SUMMARY OF THE INVENTION

According to one aspect of the present invention there is provided a semiconductor device comprising first and second glass layers facing to each other, the first glass layer having an overhung portion protruded from an edge of the second glass layer, a silicon layer bonded to the first and second glass layers in such a manner as to be positioned between the first and second glass layers, and at least an interconnection formed between the silicon layer and the first glass layer and having a bonding pad positioned on the inner surface of the overhung portion of the first glass layer.

According to another aspect of the present invention there is provided a semiconductor device comprising first and second glass layers facing to each other, the first glass layer having an overhung portion protruded from an edge of the second glass layer, a silicon layer bonded to the first and second glass layers in such a manner as to be positioned between the first and second glass layers, at least a first interconnection formed between the silicon layer and the first glass layer and having a bonding pad positioned on the inner surface of the overhung portion of the first glass layer, and at least a second interconnection formed between the silicon layer and the second glass layer, wherein the silicon layer has a conductive isolated portion insulated from the rest of the silicon layer, the first interconnection being electrically connected to the second interconnection through the conductive isolated portion.

According to a further aspect of the present invention there is provided a method of manufacturing a semiconductor device which comprises first and second glass layers facing to each other, and a silicon layer positioned between the first and second glass layers in contact with the inner surfaces of the first and second glass layers, the fist glass layer having an overhung portion protruded from an edge of the second glass layer, and the method comprising the steps of preparing first and second glass wafers and a silicon wafer, the silicon wafer being to form the silicon layer, the first and second glass wafers being to form the first and second glass layers, respectively, and the second glass wafer having an unnecessary portion which is to be cut off, forming an anodic-bonding-inhibition-layer on the surface of the unnecessary portion of the second glass wafer, overlapping the fist and second glass wafers and the silicon wafer in such a manner that the silicon wafer is positioned between the first and second glass wafers and held in contact with the anodic-bonding-inhibition-layer, electrostatically bonding the first and second glass wafers to the silicon wafer through an anodic bonding process after the overlapping step, and cutting the second glass wafer along the configuration of the anodic-bonding-inhibition-layer after the electrostatically bonding step so as to separate the unnecessary portion of the second glass wafer together with the anodic-bonding-inhibition-layer from the rest of the second glass wafer and form the overhung portion of the first glass layer.

BRIEF DESCRIPTION OF THE DRAWINGS

The features and advantages of a semiconductor device and a method of manufacturing the same in accordance with the present invention will be more clearly understood from the following description take in conjunction with the accompanying drawings in which:

FIG. 1 (b) is a cross-sectional view taken along the line I—I in FIG. 1 (a);

FIG. 1 (c) is a cross-sectional view take along the line II—II in FIG. 1 (a);

FIG. 1 (d) is a cross-sectional view take along the line III—III in FIG. 1 (a);

FIG. 1 (e) is a cross-sectional view take along the line IV—IV in FIG. 1 (a);

DESCRIPTION OF THE PREFERRED EMBODIMENTS

Figure 1A:
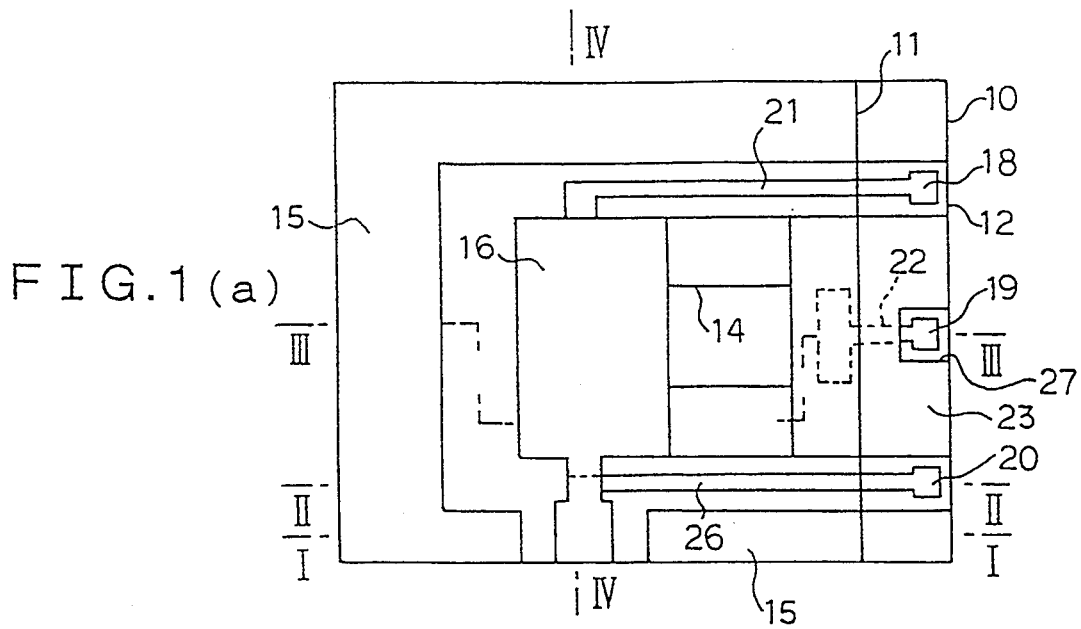
FIG. 1 (a) is a top plan view of a semiconductor acceleration sensor of an electrostatic capacity type according to the present invention.
Figure 1B:
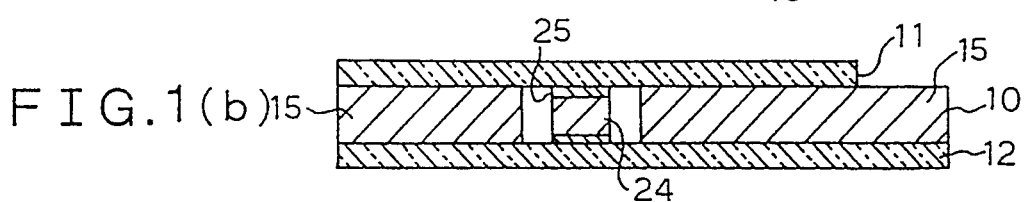
Figure 1C:
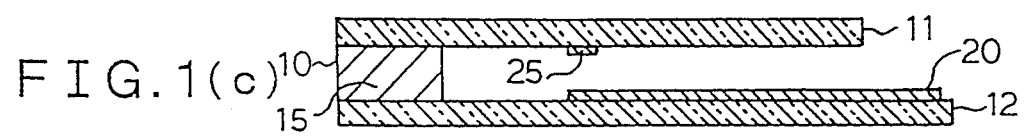
Figure 1D:
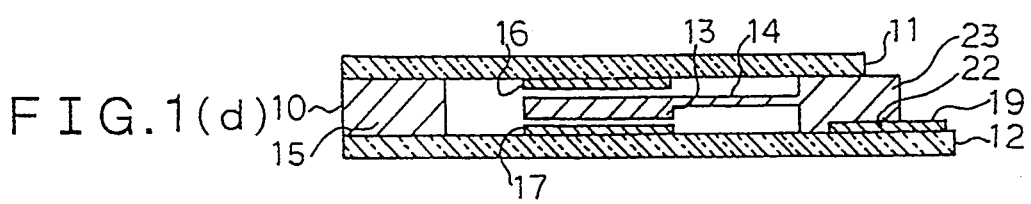
Figure 1E:
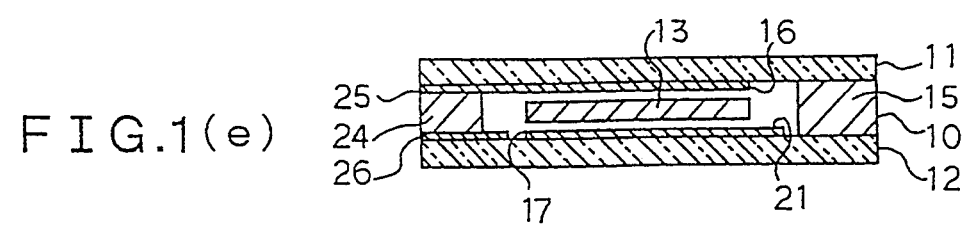
Figure 2:
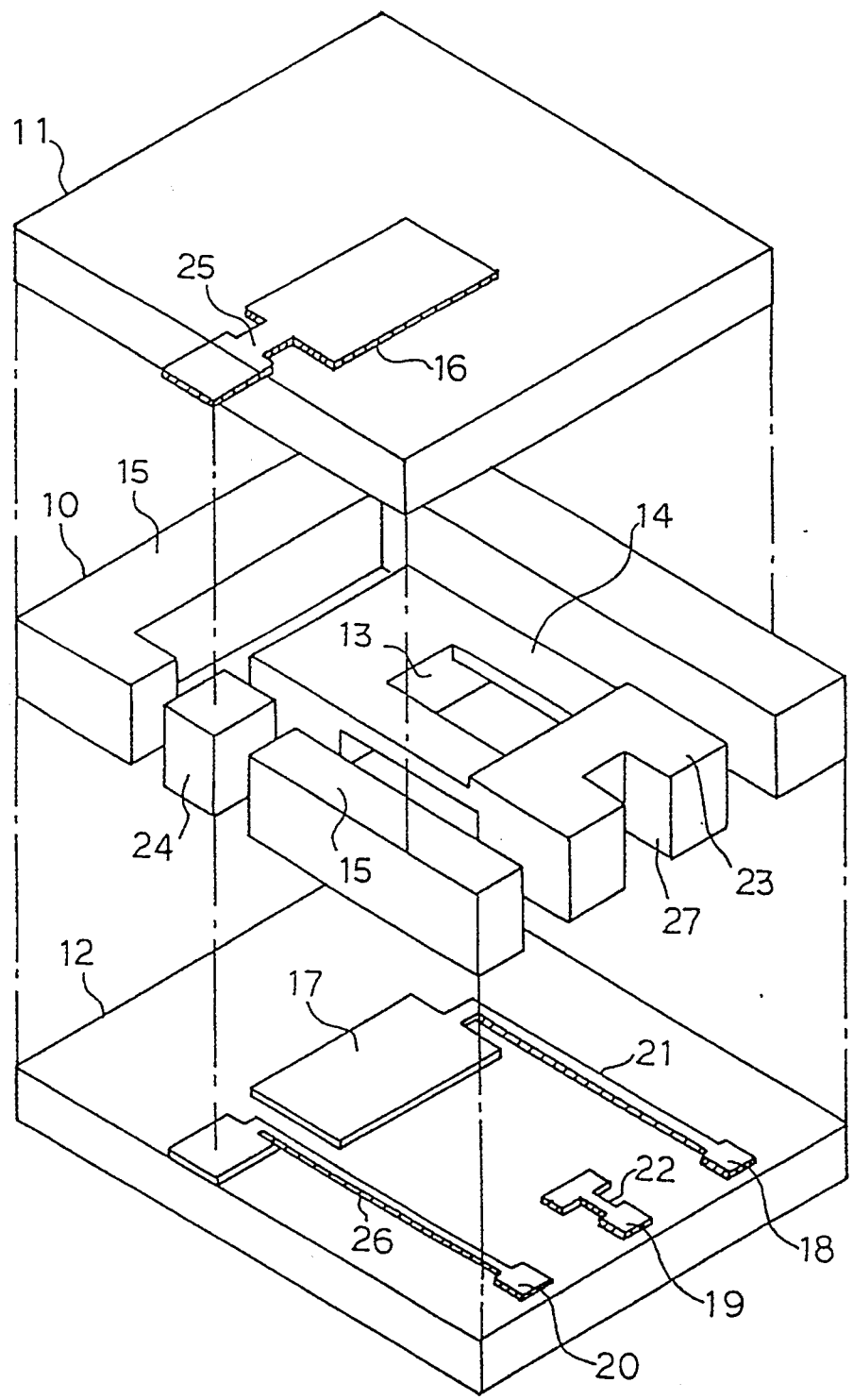
FIG. 2 is an exploded perspective view of the acceleration sensor shown in FIG. 1 (a)

Referring to FIGS. 1(a) to 1 (e) and FIG. 2 of the drawings, a semiconductor device embodying the present invention is designed as a semiconductor acceleration sensor of an electrostatic capacity type and comprises a silicon layer 10, first and second glass layers 12 and 11, static electrodes 16 and 17, and interconnections 21, 22, 25 and 26. The first and second glass layers 12 and 11 face to each other and are of "PYREX" (Registered Trade Mark) glass. The silicon layer 10 is bonded to the first and second glass layers 12 and 11 in contact with the inner surfaces of the first and second glass layers 12 and 11.

In addition, the silicon layer 10 comprises a cantilever portion 14, supporting portions 15 and an isolated portion 24 which are separated and insulated from one another. The cantilever portion 14 includes a cantilever spaced away from the first and second glass layers 12 and 11, a base portion 23 supporting the cantilever, and a weight portion 13 formed with the free end of the cantilever. The weight portion 13 functions as a movable electrode positioned between the static electrodes 16 and 17 in such a manner as to be spaced away from the static electrodes 16 and 17. Therefore, the portion indicated by the reference numerals 13 is hereinlater referred to not only as a weight portion but also as a movable electrode. The first and second glass layers 12 and 11 are substantially supported by the supporting portions 15 of the silicon layer 10.

The static electrodes 16 and 17 are formed with and electrically connected to the interconnections 25 and 21, respectively. The static electrodes 16 and the interconnection 25 is positioned between the silicon layer 10 and the second glass layer 11, while, the static electrode 17 and the interconnections 21, 22 and 26 having bonding pads 18, 19 and 20, respectively, are positioned between the silicon layer 10 and the first glass layer 12. The static electrodes 16 and 17 and the interconnections 21, 22, 25 and 26 are, for example, of aluminum.

In the meantime, the first glass layer 12 has an overhung portion protruded from an edge of the second glass layer 11. The aforementioned bonding pads 18, 19 and 20 of the interconnections 21, 22 and 26 are positioned on the inner surface of the overhung portion of the first glass layer 12. Additionally, the bonding pads 18 and 20 are placed in apertures between the supporting portions 15 and the cantilever portion 14, while, the bonding pad 19 is placed in a recess 27 formed with the base portion of the cantilever 14, thereby causing the bonding pads 18, 19 and 20 to be not covered with the silicon layer 10 to expose the bonding pads 18, 19 and 20 to the atmosphere.

Both the static electrode 17 and the interconnection 21 are not held in contact with the silicon layer 10. Therefore, the static electrode 17 is electrically connected to the bonding pad 18 only through the interconnection 21. One end portion of the interconnection 22 remote from the bonding pad 19 is held in contact with the base portion 23 of the silicon layer 10, thereby having the movable electrode 13 electrically connect with the bonding pad 19 through the cantilever portion 14 of the silicon layer 10. One end portion of the interconnection 25 remote from the static electrode 16, and one end portion of the interconnection 26 remote from the bonding pad 20 are held in contact with the isolated portion 24 of the silicon layer 10, so that the static electrode 16 are electrically connected to the bonding pad 20 through the interconnection 25, the isolated portion 24 and the interconnection 26.

As will have been understood from the foregoing description, the bonding pads 18, 19 and 20 are electrically connected to the electrodes 17, 13 and 16, respectively, and positioned on the overhung portion of the first glass layer 12 protruded from the edge of the second glass layer 11, thereby making it possible to easily bond wires (not shown) to bonding pads 18, 19 and 20 so as to electrically connect to the electrodes 16, 13 and 17 to the wires.

Figure 4:
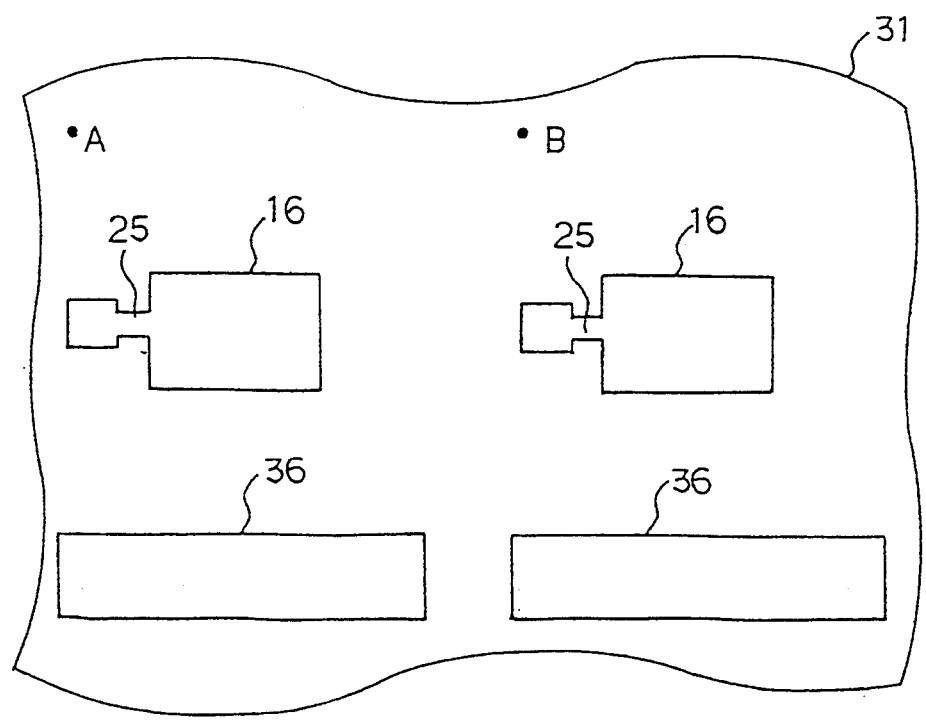
FIG. 4 is a fragmentary top plan view of a glass wafer that is to form a plurality of second glass layers shown in FIG. 2.
Figure 5:
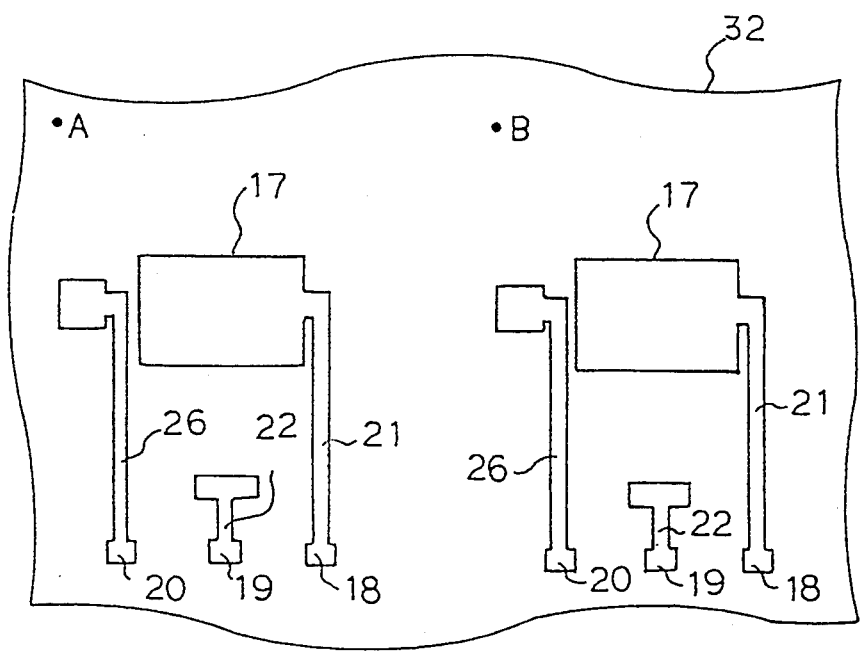
FIG. 5 is a fragmentary top plan view of a glass wafer that is to form a plurality of first glass layers shown in FIG. 2.

The method of manufacturing the foregoing electrostatic capacity type semiconductor acceleration sensor will be described hereinlater with reference to FIGS. 3 to 6. This kind of acceleration sensor is manufactured by utilizing the semiconductor integrated circuit manufacturing techniques. When a silicon wafer 30 and two glass wafers 31 and 32 shown in FIGS. 3 to 5 are processed under such a manufacturing techniques, a plurality of acceleration sensors are produced at once.

Figure 3:
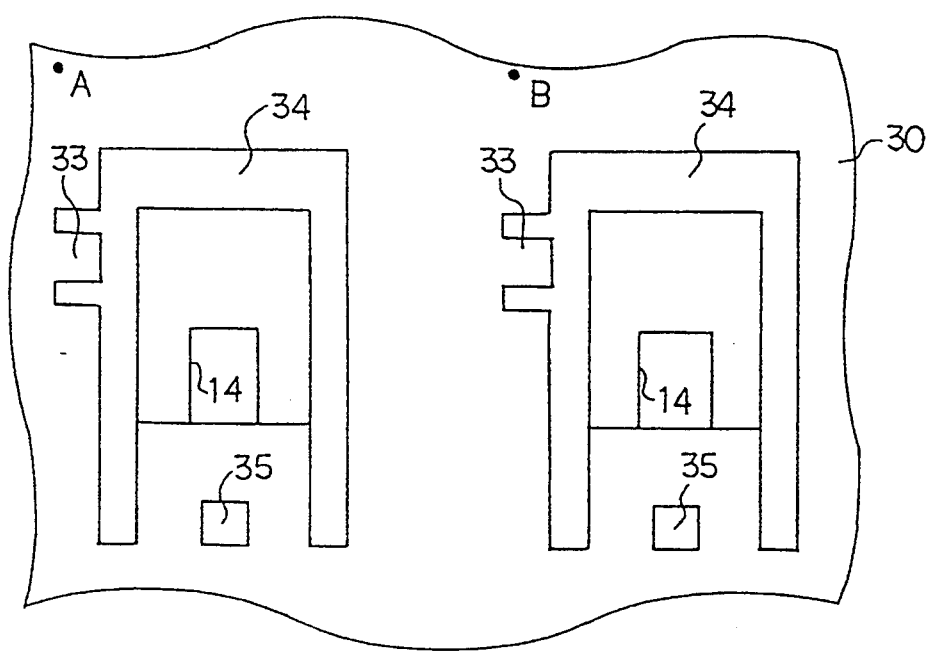
FIG. 3 is a fragmentary top plan view of an etched silicon wafer that is to form a plurality of silicon layers shown in FIG. 2.

FIG. 3 is a top plan view showing in part the silicon wafer 30 etched depending upon the following steps in such a manner as to form a plurality of silicon layers 10. In FIG. 3, reference numerals 33 denote portions each expected to form the conductive isolated portion 24 shown in FIGS. 1 (b) and 2. The thickness of the free end of the cantilever, i.e., the thickness of the weight 13 of the cantilever portion 14 is different from that of the fixed end of the cantilever, so that the silicon wafer 30 is required to be treated through at least two steps each including an anisotropic etching.

In the first step, both surfaces of the silicon wafer 30 are oxidized to form silicon dioxide (referred to as "$SiO_2$") layers on the surfaces. A photolithographic technique is then used to selectively remove the $SiO_2$ layers. More specifically, the selectively removing process comprises the steps of coating the $SiO_2$ layers with photoresist films, exposing the photoresist films to ultraviolet thorough photomasks each having a plurality of patterns defining the configuration of the cantilever portion 14, developing the photoresist films to remove useless portions of the photoresist films, etching the $SiO_2$ layers with a buffered hydrofluoric acid to remove portions of the $SiO_2$ layers uncovered with the photoresist films, and removing the remaining photoresist films. Next, the silicon wafer 30 having the etched $SiO_2$ layers is put into contact with a 50 weight % potassium hydroxide solution at 80° C., whereby the first anisotropic etching is carried out to form the cantilever portion 14 in part. After the first anisotropic etching, the $SiO_2$ layers are removed and thus the first step is accomplished.

The second step similar to the aforementioned first step except that each of the photomasks used in the second step has a pattern different from that of each of photomasks used in the first step is performed after the first step, thereby causing the cantilever portion 14 together with through slots 34 and through bores 35 to be completely formed.

FIG. 4 is a plan view showing in part a second glass wafer 31 on which the interconnections 25, the electrodes 16 and the following anodic-bonding-inhibition-layers 36 are formed. The glass wafer 31 is to form a plurality of second glass layers 11. In FIG. 4, the interconnections 25, the static electrodes 16 and the anodic-bonding-inhibition-layers 36 is seen through the transparent glass wafer 31 and formed depending upon the steps described hereinafter.

First, a thin aluminum layer is formed all over on one side surface of the second glass wafer 31 by sputtering, and then the thin aluminum layer is coated with a photoresist layer in order to utilize the photolithographic technique, thereby making it possible to form the patterns of photoresist layer corresponding to configurations of the static electrode 16 and the interconnection 25 and the anodic-bonding-inhibition-layer 36. After the portion of the thin aluminum layer uncovered with the photoresist layer is removed, the photoresist layer is removed, thereby resulting in the completion of the static electrodes 16, the interconnections 25 and the anodic-bonding-inhibition-layers 36 as shown in FIG. 4.

FIG. 5 is a top plan view showing in part a first glass wafer 32 on which the static electrodes 17 and interconnections 21, 22 and 26 having the bonding pads 18, 19 and 20, respectively, are formed depending upon a manner similar to that employed for forming the static electrodes 16 and the interconnections 25. The first glass wafer 32 is to form a plurality of first glass layers.

Figure 6:
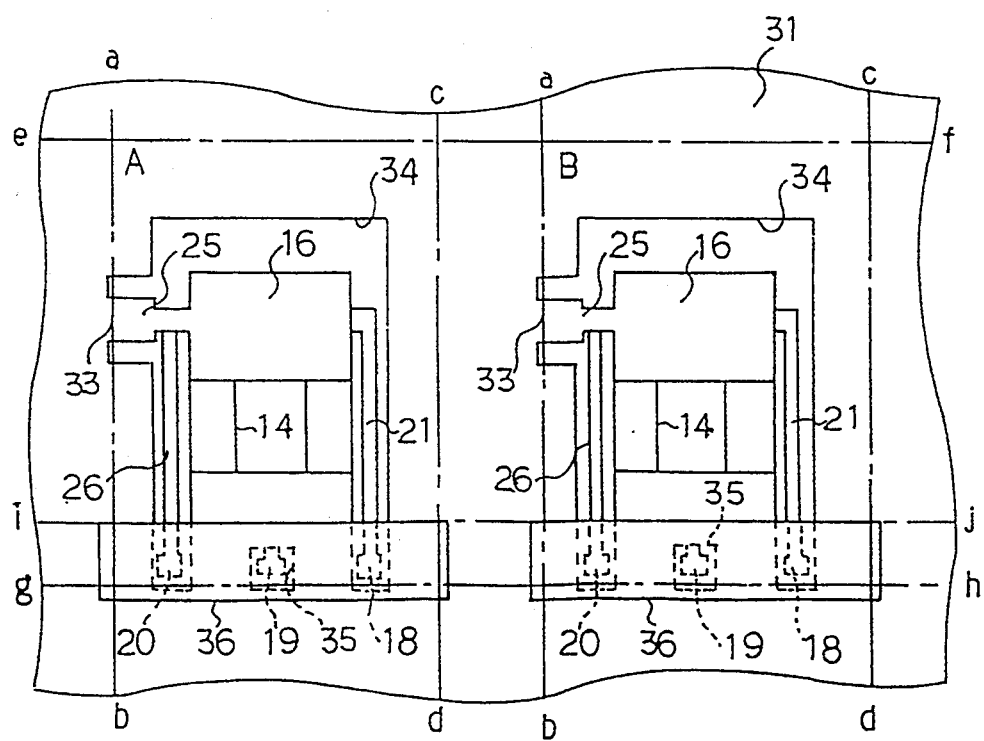
FIG. 6 is a top plan view of the overlapped wafers shown in FIGS. 3 to 5.
Figure 7:
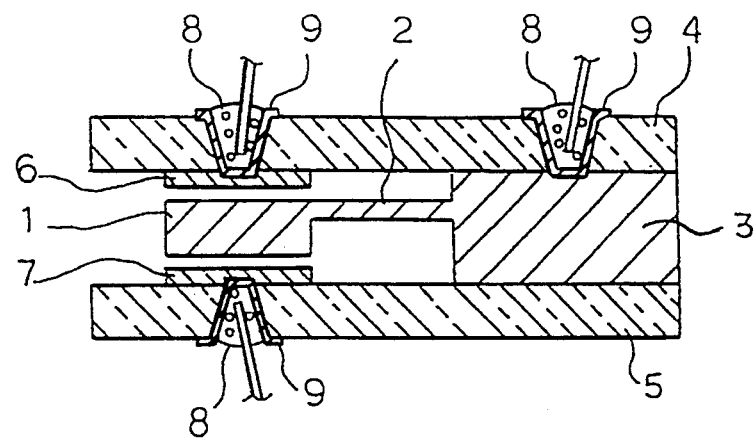
FIG. 7 is a cross-sectional view of a conventional semiconductor acceleration sensor of an electrostatic capacity type.

The first silicon wafer 30 etched as hereinbefore described is overlaid on glass wafer 32 provided with the static electrodes 17 and the interconnections 21, 22 and 26, and then the glass wafer 31 provided with the static electrodes 16, the interconnections 25 and the anodic-bonding-inhibition-layers 36 is overlaid on the silicon wafer 30 in such a manner that points A and B dotted on wafers in FIGS. 3 to 5 are overlapped with one another. FIG. 6 is a top plan view of the overlaid wafers 30, 31 and 32.

The overlaid wafers 30, 31 and 32 are bonded to one another through a bonding method as hereinafter described. The overlaid wafers 30, 31 and 32 are heated to about 400° C., and then high voltages on the order of several hundred volts are applied between the silicon wafer 30 and the second glass wafer 31, and between the silicon wafer 30 and the first glass wafer 32, so that large electrostatic attractions are between the adjoining wafers. By the electrostatic attractions, the contact surfaces of the silicon wafer 30 and the first and second glass wafers 32 and 31 are bonded to each other. Such a bonding is a kind of chemical bonding and is called an anodic bonding or an electrostatic bonding.

The anodic bonding process enables the silicon wafer to be bonded to the glass wafer, however, the silicon wafer can not be bonded to the aluminum film formed between the silicon wafer and the glass wafer. Therefore, the anodic-bonding-inhibition-layers 36, the interconnections 21, 22, 26 and 25, and the static electrodes 16 and 17 are not bonded to the silicon wafer 30 during and after the foregoing anodic bonding process.

After the anodic bonding process, the bonded wafers are cut along single dot and dash lines in FIG. 6 depending upon a dicing process and divided into a plurality of chips. Specifically, all the wafers are cut along the lines a-b, c-d, e-f and g-h, while, only the second glass wafer 31 is cut along the line i-j. At this time, the portions of the second glass wafer 31 surrounded with the lines a-b, c-d, g-h and i-j are separated from the silicon wafer 30 because the anodic-bonding-inhibition-layer 36 and the silicon wafer 30 are not bonded to each other as hereinbefore described. In addition, due to the cutting in the line a-b, the portions 33 of the silicon wafer 30 are isolated and insulated from the rest of the silicon wafer 30 to form the isolated portions 24. When the aforementioned process is accomplished, a plurality of acceleration sensors each shown in FIG. 1 are obtained.

While the aforementioned acceleration sensor has been assumed to be a differential capacitance type sensor comprising the static electrodes 16 and 17 facing to the movable electrode 13, the acceleration sensor may comprise only one static electrode facing to the movable electrode according to the present invention. It goes without saying that the present invention may be applied to other devices comprising two glass layers facing to each other and a silicon layer bonded to the glass layers in such a manner as to be positioned between the glass layers.

As will have been appreciated from the foregoing description, the semiconductor device and the method of manufacturing the same according to the present invention have the following advantages.

The portions of the second glass wafer and the silicon wafer facing to the bonding pads of the interconnections are removed during the etching and the dicing processes, so that the wires can be easily bonded to the bonding pads. Since it is unnecessary to form in the glass layers the through bores through which the wires are electrically connected to the electrodes between the glass layers, the strength of the glass layers is prevented from being reduced. In addition, the prior art processes of forming the through bores, covering the bottom and side surfaces of the through bores with alloys, and of filling up the through bores with conductive epoxy resins are unnecessary. As a consequent, not only the semiconductor device manufacturing method according to the present invention can be easily performed, but also the semiconductor device according to the present invention is suitable for mass production.

In the case that a predetermined portion of the glass layer bonded to the silicon layer by using the anodic bonding process is removed, the method according the present invention can be carried out. That is, the anodic-bonding-inhibition-layer such as a aluminum layer is positioned between the predetermined portion of the glass layer and the silicon layer before the anodic bonding process, so that the predetermined portion of the glass layer can be easily cut away after the anodic bonding process. This method using the anodic-bonding-inhibition-layer according to the present invention is effective for manufacture of various semiconductor devices and, particularly, for manufacture of micromachines.

It will be understood by those skilled in the art that the foregoing description is in terms of preferred embodiment of the present invention wherein various changes and modification may be made without departing from the spirit and scope of the invention, as set forth in the appended claims.

What is claimed is:

1. A method of manufacturing a semiconductor device which comprises first and second glass layers facing to each other, and a silicon layer positioned between said first and second glass layers in contact with the inner surfaces of said first and second glass layers, said first glass layer having an overhung portion protruded from an edge of said second glass layer, and said method comprising the steps of:

preparing first and second glass wafers and a silicon wafer, said silicon wafer being to form said silicon layer, said first and second glass wafers being to form said first and second glass layers, respectively, and said second glass wafer having an unnecessary portion which is to be cut off;

forming an anodic-bonding-inhibition-layer on the surface of said unnecessary portion of said second glass wafer;

overlapping said first and second glass wafers and said silicon wafer in such a manner that said silicon wafer is positioned between said first and second glass wafers and held in contact with said anodic-bonding-inhibition-layer;

electrostatically bonding said first and second glass wafers to said silicon wafer through an anodic bonding process after said overlapping step; and cutting said second glass wafer along the configuration of said anodic-bonding-inhibition-layer after said electrostatically bonding step so as to separate said unnecessary portion of said second glass wafer together with said anodic-bonding-inhibition-layer from the rest of said second glass wafer and form said overhung portion of said first glass layer.

2. A method of manufacturing a semiconductor device as set forth in claim 1, wherein said anodic-bonding-inhibition-layer is an aluminum layer.

3. A method of manufacturing a semiconductor device as set forth in claim 1, further comprising the step of forming at least an interconnection on a surface of said first glass wafer before said electrostatically bonding step, said interconnection having a bonding pad which is to be positioned on the inner surface of said overhung portion of said first glass layer.

* * * * *